United States Patent [19]

Screen

[11] Patent Number: 4,941,552
[45] Date of Patent: Jul. 17, 1990

[54] CASTOR WITH BRAKE MECHANISM

[75] Inventor: Stafford T. Screen, Stourbridge, England

[73] Assignee: Colson Castors (Europe) Limited, West Midlands, United Kingdom

[21] Appl. No.: 255,830

[22] Filed: Oct. 7, 1988

[30] Foreign Application Priority Data

Oct. 21, 1987 [GB] United Kingdom ............... 8724678

[51] Int. Cl.[5] .............................................. B60B 33/00
[52] U.S. Cl. .................................... 188/1.12; 16/35 R
[58] Field of Search ............. 188/1.12; 16/35 R, 35 D

[56] References Cited

U.S. PATENT DOCUMENTS

| | | | |
|---|---|---|---|
| 1,633,638 | 6/1927 | Jarvis et al. | 188/1.12 X |
| 2,709,828 | 6/1955 | Noelting et al. | 16/35 R |
| 3,162,888 | 12/1969 | Mobus | 16/35 D |
| 3,881,216 | 5/1975 | Fontana | 188/1.12 |
| 3,890,668 | 6/1975 | Strosberg | 16/35 |
| 4,479,566 | 10/1984 | Ishii | 188/1.12 |
| 4,550,808 | 11/1985 | Folson | 188/1.12 |
| 4,669,580 | 6/1987 | Neville | 188/1.12 |

FOREIGN PATENT DOCUMENTS

| | | |
|---|---|---|
| 807657 | 1/1959 | United Kingdom . |
| 1510844 | 5/1978 | United Kingdom . |
| 2151470A | 7/1985 | United Kingdom . |
| 2160415A | 12/1985 | United Kingdom . |
| 2179848A | 3/1987 | United Kingdom . |

*Primary Examiner*—Andres Kashnikow
*Assistant Examiner*—Matthew C. Graham
*Attorney, Agent, or Firm*—John C. Gealow; James M. Wetzel

[57] ABSTRACT

A castor has a two-armed integrally formed spring metal brake member which is pivoted on the castor body for selective movement between a braking position, in which a detent portion on one arm brakingly engages teeth on the castor wheel, to prevent wheel rotation, and a detent portion on the other arm engages teeth on a mounting member on which the body swivels, to prevent swivelling, and a release position in which the detent portions are spaced from the teeth.

17 Claims, 4 Drawing Sheets

CASTOR WITH BRAKE MECHANISM

FIELD OF THE INVENTION

The invention relates to a castor having a brake mechanism.

BACKGROUND OF THE INVENTION

Known castors comprise a body mounting one or two castor wheels for rotation about a generally horizontal wheel axis, the body being carried for swivelling, about an upright swivel axis spaced from the wheel axis by a mounting structure for mounting the castor to an article of furniture or the like to be supported by the castor. A brake mechanism can be incorporated so that the wheels can be selectively braked against rotation, and/or the body can be braked against swivelling. Braking can be effected frictionally, but disadvantages then arise from wear of the engaging parts and from material entering in use between them. Braking can instead be effected by engagement of toothed brake elements, but difficulties then arise from the lack of registration that inevitably sometimes occurs.

It is accordingly an object of the invention to provide a castor brake member which is resiliently engageable with braking teeth provided on appropriate castor parts to effect braking against either one or both of wheel rotation and swivelling movement.

It is also an object of the invention to provide for the braking of a castor against both rotation of its wheel or wheels, and the body on which the wheels are mounted, by movement of a spring metal brake member.

It is a further object of the invention to provide a castor having a castor body mounting one or more castor wheels and a spring metal brake member which incorporates an integrally formed pivot portion by which it is pivotably carried by integrally formed portions of the castor body.

SUMMARY OF THE INVENTION

The present invention accordingly provides a castor having a brake mechanism comprising a spring brake element engageable between teeth to effect braking of the castor against swivelling and/or wheel rotation, so that any mismatch between the spring element and the teeth can be accommodated by the resilience of the element.

Preferably, a single unitary spring element is arranged to effect braking against both swivelling and wheel rotation; conveniently both such braking effects are achieved together by a single movement of the spring element. The spring element can incorporate an integral biassing portion engageable by the castor body to urge the element into its braking or its release position, from which it can be moved for example by direct engagement of a control lever or pedal mounted on the castor for selective operation by the user. The spring element and such a control lever or pedal can be shaped to co-operate so as to be held in the selected position.

The spring brake element may further be configured so as to be held in place in the castor by co-operation of an integral mounting portion with a portion of the castor body. The spring element can be arranged to pivot about this mounting portion in moving between its braking and its release positions. The spring element may thus have two braking portions, one for braking against wheel rotation and the other for braking against swivelling, extending in different directions away from such a mounting portion.

BRIEF DESCRIPTION OF THE DRAWINGS

The invention is further described below, by way of example, with reference to the accompanying drawings, in which.

Figure 1:
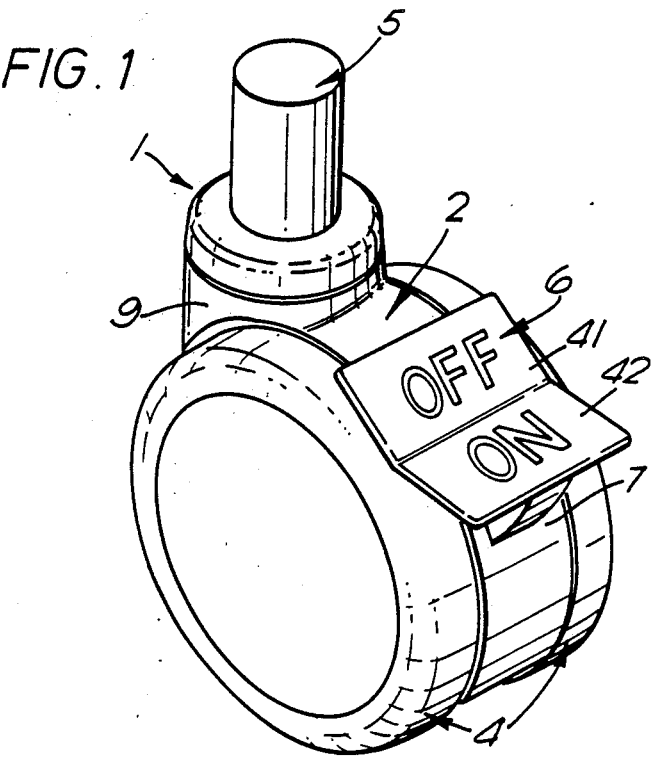
FIG. 1 is a perspective view of a castor embodying the invention.
Figure 3:
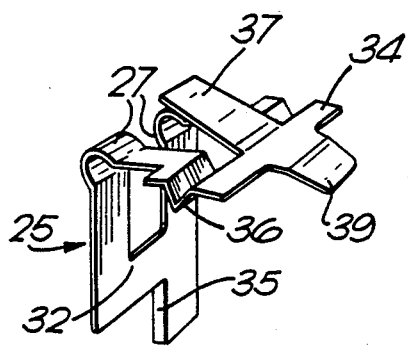
FIG. 3 is a perspective view of a spring brake member of the castor.

The illustrated castor 1 comprises a body 2, which may be for example an aluminium pressure die casting, on which two wheels 4 are journalled for rotation about a wheel axis which is normally generally horizontal in use. The body is itself rotatable about a swivel axis which is generally vertical in use and which is spaced from the wheel axis, on a mounting member in the form of a spindle 5. By means of the spindle 5, the castor can be mounted on an article of furniture or the like to be supported by the castor, the spindle being non-rotatably engaged with the article. The castor can be selectively braked against wheel rotation and swivelling by manual operation of a lever or pedal 6 mounted on the body 2.

The body 2 will be seen to comprise an outer portion 7 of which the outer surface is largely part of a circular cylindrical surface. This outer surface is received between the wheels 4 and corresponds in shape to their outer peripheries. At its leading end, the outer surface of the body 2 includes a generally upright cylindrical front portion 9 for receiving the mounting spindle 5. The pedal 6 is pivotably mounted in a recess formed in the cylindrical outer surface so as to be readily accessible from the rear of the castor.

Internally of the body 2, a wheel support portion 10 extends downwardly from the outer portion 7. An axle 11 extends transversely through an aperture in the support portion and mounts a castor wheel 4 on each end. Each wheel 4 comprises a side wall, with an outer rim 12, which may be constituted by a tire of rubber or plastics material, and a central hub 4 with a groove 15. The grooves 15 are engaged by the free ends of side webs of a channel member 16 fastened to the lower end of the support portion 10 by a fastener 17, so that the wheels are restrained against axial movement on the axle 11, whilst being permitted to rotate.

Between the hub and the outer rim, a concentric sleeve portion 20 extends inwardly from the side wall of each wheel 4, the outer surface of the sleeve portion being provided with a series of teeth 21 of generally triangular cross-section, which can be engaged to brake the wheel against rotation.

The spindle 5 protrudes downwardly through the cylindrical front portion 9 of the body 2, the protruding lower end portion having fixed thereto, by a fastener 23, a sleeve having a series of longitudinally extending external teeth 24 of generally square or rectangular cross-section around it. These teeth 24 can be engaged to brake the body 2 against swivelling because of the non-rotational securement of the spindle 5.

Figure 4:
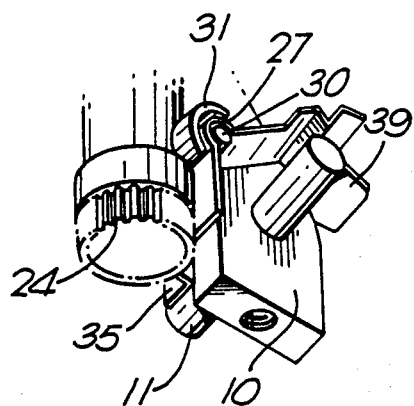
FIG. 4 is a fragmentary perspective view from underneath the castor, showing the spring brake member in place.
Figure 5:
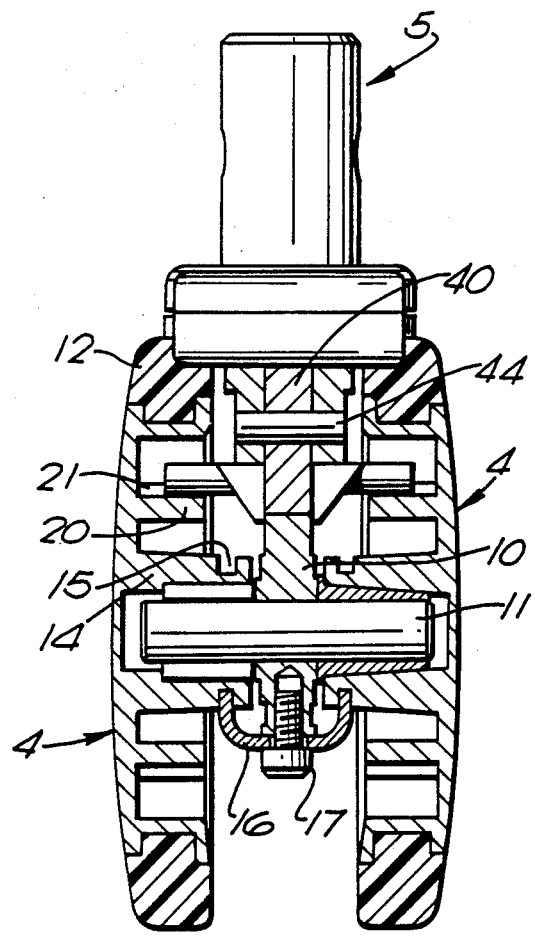
FIG. 5 is a part-sectional rear view of the castor taken on the line V—V of FIG. 6.

The support portion 10 of the castor body 2 mounts a brake member 25, formed from sheet spring metal, which is movable between braking and release positions by the pedal 6. As best appears from FIG. 4, the brake member 25 is very roughly of rectangular configuration, with two longer side limbs which are bent to form aligned pivot portions 27 and which receive the castor body support portion 10 between them. Aligned stub shafts 30 and spaced concentric hood portions 31 project laterally from the sides of the support portion 10 and the pivot portions 27 are each received between a respective one of the stub shafts and hood portions, so that the brake member is retained on the support portion but can pivot about the stub shaft axis.

The brake member side limbs extend away from the pivot portions 27 downwardly and rearwardly to transverse lower and rear end limbs 32 and 34. From the lower end limb 32, a swivel brake portion extends downwardly to a lip portion 35 turned at right angles for engagement between the teeth 24 at the lower end of the spindle 5.

The rear portions of the side limbs extend away from the pivot portions 27 to transversely aligned V-shaped portions 36 each shaped to engage between the teeth 21 of a respective one of the castor wheels. An integral biassing portion 37 of the brake member 25 extends forwardly from the rear end limb 34, from which an operating portion 39 extends rearwardly and downwardly. The free end of the biassing portion 37 engages an abutment on the body portion 10, whereby the brake member 25 is biassed into its released position, shown in FIG. 6.

The pedal 6 comprises a plate portion 40 received in the recess in the castor body 2 to extend generally along the longitudinal median plane of the body. The portion 40 supports at its outer edge two adjoined transversely extending push plates 41,42 which are inclined so as to include between them an external angle of some 150°. The portion 40 is apertured to receive a pivot pin 44 extending through it from the sides of the recess in the body 2, and its edge adjacent the brake member 25 includes a cam or nose portion 45 which can engage the brake member operating portion 39.

Figure 2:
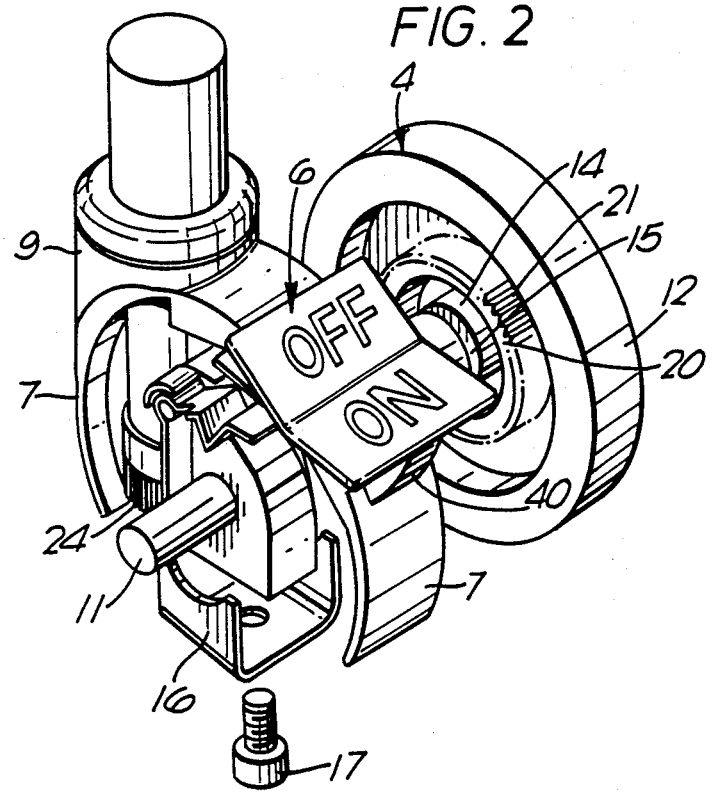
FIG. 2 is a similar view of the castor but with the one wheel omitted and certain components spaced apart.
Figure 6:
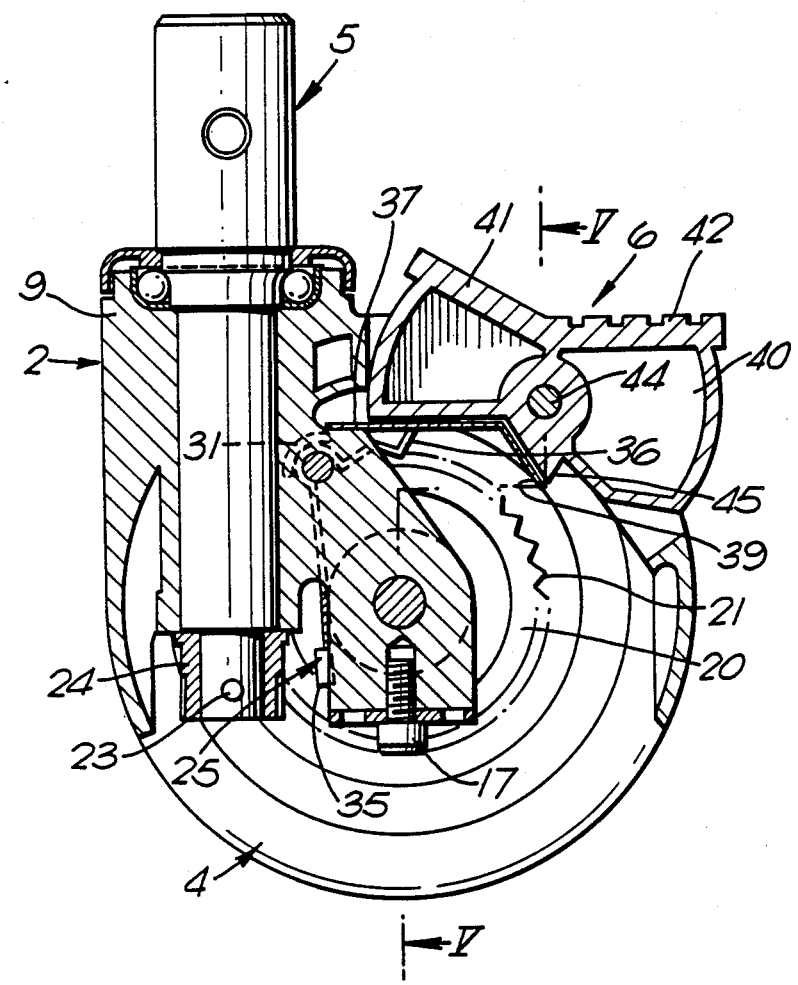
FIG. 6 is a part-sectional side view of the castor.

The pedal push plates 41 and 42 may be marked 'OFF' and 'ON' respectively as appears from FIGS. 1 and 2, or the plate 42 may be ridged to facilitate operation as shown in FIG. 6. If the plate 42 is depressed, the brake mechanism is bought to the braking position. The nose portion 45 here acts on the operating portion 39 of the brake member 25, so that the brake member is pivoted clockwise from the position of FIG. 6 and against the bias of the biassing portion 37 to bring the V-shaped portions 36 between the wheel teeth 21 and the lip portion 35 between the spindle teeth 24. The nose portion 45 rides on the brake member rear limb 34 to maintain this position, in which the castor 1 is locked against wheel rotation and against swivelling.

When it is desired to release the brake, the pedal 6 is pivoted anti-clockwise from the braking position, by pressure on the push plate 41, to the position of FIG. 6. The nose portion 45 then no longer depresses the operating portion 39 so the biassing portion 37 acts to pivot the brake member anti-clockwise around the stub shafts 30, so withdrawing the lip portion 35 from the teeth 24 and the V-shaped portions 36 from the teeth 21. The wheels are thus free to rotate and the body is free to swivel.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A castor comprising:
   a body,
   at least one castor wheel carried by said body for rotation about a generally horizontal wheel axis,
   a mounting member, said body being carried on said mounting member for swivelling about a generally vertical axis spaced from said wheel axis,
   a first series of brake teeth on said castor wheel and a second series of teeth on said mounting member, and an integrally formed resilient brake member having first and second detent portions, said brake member being selectively movable between a braking position and a release position, wherein said first and second detent portions resiliently engage said first and second series of teeth respectively to brake said castor against body swivelling and wheel rotation and in said braking position said first and second detent portions are spaced from said first and second series of teeth.

2. The castor of claim 1 wherein said brake member comprises a spring metal brake member.

3. The castor of claim 1 wherein said first detent portion and said brake teeth of said first series are generally V-shaped in cross-section.

4. The castor of claim 1 wherein said brake teeth of said second series are generally rectangular in cross-section.

5. The castor of claim 1 wherein said brake member comprises an integrally formed pivot portion thereof whereby said brake member is pivotably mounted on said castor body.

6. The castor of claim 1 further comprising an operating member acting on said brake member and selectively movable between braking and release positions to cause said brake member to move between said braking and release positions thereof.

7. The castor of claim 6 wherein said operating member is releasably retained in the selected position thereof by the resilience of said brake member.

8. The castor of claim 1 wherein said first and second detent portions are provided respectively on a first, downwardly extending, limb of said brake member and on a second limb of said brake member extending transversely of said first limb, and wherein said brake member is pivotably mounted on said castor body at the junction of said first and second limbs.

9. The castor of claim 8 further comprising a control member rotatably mounted on said castor body for selective movement between braking and release positions thereof in which said control member releasably retains said brake member in the braking and release positions thereof respectively, by engagement of said control member with a control portion of said second limb.

10. The castor of claim 8 wherein said brake member has a biassing portion in engagement with said body so as to bias said brake member into said release position thereof.

11. The castor of claim 8 wherein said body has a central wall portion mounting a castor wheel on either side thereof, and wherein said brake member is apertured between the free ends of said limbs thereof so as to receive said central body wall portion within said aperture.

12. The castor of claim 8 wherein said brake member is formed with a generally arcuate portion at the junction of said limbs, wherein said castor body is formed with an arcuate slot and wherein said arcuate portion is pivotably received in said arcuate slot.

13. A castor comprising:
mounting means for mounting the castor on a furniture or other article to be supported thereby,
a castor body carried by said mounting means for rotation about a generally vertical swivel axis,
wheel means carried by said castor body for rotation about a generally horizontal wheel axis spaced from said swivel axis,
a first series of teeth on said mounting means and extending around said swivel axis,
a second series of teeth on said wheel means and extending around said wheel axis,
an integrally formed spring metal brake member having first and second detent portions, said brake member being mounted on said castor body for movement between a braking position in which said first and second detent portions are brakingly engaged with said first and said second series of teeth respectively and a release position in which said first and second detent portions are spaced from said first and second series of teeth,
operating means selectively movable to move said brake member between said braking and release positions thereof.

14. The castor of claim 13 wherein said castor body is carried by said mounting means by reception of said mounting means in an aperture in said castor body, said mounting means has a portion protruding downwardly through said aperture beyond said castor body, and said first series of teeth is located on said downwardly protruding portion.

15. The castor of claim 13 wherein said brake member has an arcuate pivot portion, a first limb extending downwardly from said pivot portion to said first detent portion and a second limb extending generally horizontally from said pivot portion to said second detent portion and to an operating portion engaged by said operating means and located beyond said second detent portion.

16. The castor of claim 15 wherein said castor body is provided with a post and an arcuate wall portion concentric with said post, said post and arcuate wall portion projecting laterally from said castor body, and wherein said brake member is mounted on said castor body by reception of said arcuate portion thereof between said posts and said arcuate wall portion.

17. The castor of claim 15 wherein said brake member has a biassing portion extending from between said operating and second detent portions towards said arcuate portion for engagement with said castor body to bias said brake member to said release position thereof.

* * * * *

UNITED STATES PATENT AND TRADEMARK OFFICE
CERTIFICATE OF CORRECTION

PATENT NO. : 4,941,552

DATED : July 17, 1990

INVENTOR(S) : Stafford T. Screen

It is certified that error appears in the above-identified patent and that said Letters Patent is hereby corrected as shown below:

Column 4, Claim 1, line 26, after "respectively" insert -in said braking position- Column 4, Claim 1, line 28, delete "in said braking position"

Column 4, Claim 1, line 30, after "teeth" and before the "." insert -in said release position to free said castor for body swivelling and wheel rotation- Signed and Sealed this Twenty-fifth Day of June, 1991

Attest:

HARRY F. MANBECK, JR.

*Attesting Officer*   *Commissioner of Patents and Trademarks*